US011167222B2

(12) United States Patent
Quintero et al.

(10) Patent No.: US 11,167,222 B2
(45) Date of Patent: Nov. 9, 2021

(54) SINGLE-PHASE MICROEMULSION ADDITIVE FOR SEPARATION OF OIL AND WATER

(71) Applicant: Baker Hughes, a GE company, LLC, Houston, TX (US)

(72) Inventors: Lirio Quintero, Houston, TX (US); Joey Mangadlao, Houston, TX (US); Wojciech Jakubowski, Sugar Land, TX (US); Jonathan Heironimus, Rosenberg, TX (US); Carla C. Perla, Houston, TX (US); Jonathan Stewart-Ayala, Houston, TX (US)

(73) Assignee: Baker Hughes Holdings LLC, Houston, TX (US)

( * ) Notice: Subject to any disclaimer, the term of this patent is extended or adjusted under 35 U.S.C. 154(b) by 0 days.

(21) Appl. No.: 16/447,657

(22) Filed: Jun. 20, 2019

(65) Prior Publication Data

US 2020/0398190 A1 Dec. 24, 2020

(51) Int. Cl.

| | |
|---|---|
| *B01D 17/04* | (2006.01) |
| *C10G 33/04* | (2006.01) |
| *C02F 1/68* | (2006.01) |
| *C02F 1/56* | (2006.01) |
| *C02F 101/32* | (2006.01) |
| *C02F 103/36* | (2006.01) |

(52) U.S. Cl.
CPC ............. *B01D 17/047* (2013.01); *C02F 1/56* (2013.01); *C02F 1/68* (2013.01); *C10G 33/04* (2013.01); *C02F 2101/32* (2013.01); *C02F 2103/365* (2013.01); *C02F 2305/04* (2013.01)

(58) Field of Classification Search
CPC .. B01D 17/047; B01D 17/0214; C10G 33/04; C02F 1/56; C02F 2101/32; C02F 2101/325; C02F 1/68
USPC ........................................................ 210/708
See application file for complete search history.

(56) References Cited

U.S. PATENT DOCUMENTS

| | | | | |
|---|---|---|---|---|
| 4,088,600 | A * | 5/1978 | Tutein .................. | B01D 17/047 106/206.1 |
| 4,566,909 | A * | 1/1986 | Yong ...................... | C02F 1/5263 127/33 |
| 4,855,060 | A * | 8/1989 | Durham ................. | C10G 33/04 210/708 |
| 9,353,261 | B2 | 5/2016 | Nguyen | |
| 2008/0274918 | A1* | 11/2008 | Quintero .................. | C09K 8/52 507/116 |
| 2011/0031163 | A1 | 2/2011 | Byrne et al. | |
| 2011/0184075 | A1 | 7/2011 | Falk et al. | |
| 2013/0261227 | A1* | 10/2013 | Nguyen ................. | C10G 31/08 523/403 |

(Continued)

FOREIGN PATENT DOCUMENTS

WO 2013158989 A1 10/2013

*Primary Examiner* — Claire A Norris
(74) *Attorney, Agent, or Firm* — Mossman, Kumar & Tyler, P.C.

(57) ABSTRACT

A single-phase microemulsion additive may be introduced to a stream containing mixtures of or emulsions of oil and water in an effective amount to separate oil from the water in the stream and/or separating water from the oil in the stream. The single-phase microemulsion additive is formed by combining at least one demulsifier, at least one water clarifier, at least one surfactant, and optionally at least one solvent.

18 Claims, 1 Drawing Sheet

(56) References Cited

U.S. PATENT DOCUMENTS

| | | |
|---|---|---|
| 2014/0309155 A1 | 10/2014 | Man et al. |
| 2014/0378554 A1* | 12/2014 | Sexton .................... C08K 5/09 514/772.4 |
| 2016/0032197 A1 | 2/2016 | Weisner et al. |
| 2018/0327673 A1 | 11/2018 | Bennett et al. |

* cited by examiner

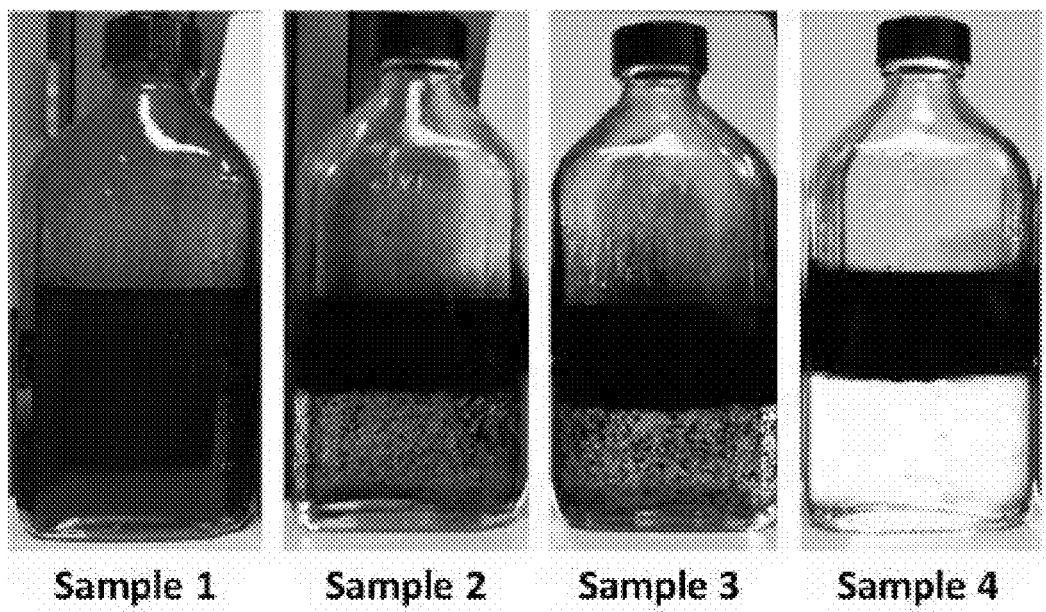

SINGLE-PHASE MICROEMULSION ADDITIVE FOR SEPARATION OF OIL AND WATER

TECHNICAL FIELD

The present invention relates to an additive useful for separating mixtures of or emulsions of oil and water in a fluid stream, and more particularly relates, to adding a single-phase microemulsion (SPME) additive comprised of a demulsifier and a water clarifier to a stream containing mixtures or emulsions of oil and water to separate the oil from the water in the stream.

BACKGROUND

To date, many different processes and additives have been used to help separate oil from water in streams accompanying the production of oil from subterranean reservoirs.

For example, demulsifiers and water clarifiers have long been used to break or resolve emulsions of oil and water in produced crude oil streams. These compounds are typically applied to the stream separately and have been shown to have limited performance. Demulsifiers may be used to primarily separate out the oil from a mixture of oil and water, where oil is the valuable component to be recovered. Water clarifiers may be used to recover the water from a mixture of oil and water, whether or not it was previously treated by a demulsifier, prior to disposal or re-use of the water. For instance, water that is a byproduct of hydrocarbon recovery operations must meet minimum standards before it is discharged into the environment.

In view of the increasing global demands for oil and potable water and tightening environmental requirements, there is an ongoing need to develop more efficient and cost-effective treatments for separating oil from water in streams containing oil/water mixtures and emulsions in order to optimize oil recovery and to make sure that such streams may be properly processed and meet the standards set for discharge or reuse.

SUMMARY

There is provided, in one form, a method for separating oil and water in a stream comprising a mixture of oil and water, in which an effective amount of a single-phase microemulsion additive is introduced to the stream to separate the oil from the water, wherein the single-phase microemulsion is comprised of at least one demulsifier, at least one water clarifier, at least one surfactant, and optionally at least one solvent.

There is further provided in another non-limiting form, a treated stream comprising a stream comprising a mixture of oil and water and from about 1 ppm to about 3000 ppm of a single-phase microemulsion additive comprising at least one demulsifier, at least one water clarifier, at least one surfactant, and at least one solvent.

In one non-limiting embodiment, the single-phase microemulsion additive is introduced to a stream containing oil and water emulsions to separate the emulsified oil and/or the emulsified water.

BRIEF DESCRIPTION OF THE DRAWINGS

FIG. 1 is a photographic illustration comparing the oil/water separation performance of a sample of crude oil containing a single-phase microemulsion additive of the kind disclosed herein to the oil/water separation performance of a sample of crude oil having no treatment additive, a sample of crude oil containing only a demulsifier, and a sample of crude oil containing only a water clarifier.

DETAILED DESCRIPTION

It has been discovered that a single-phase microemulsion additive composed of at least one demulsifier, at least one water clarifier, at least one surfactant, and optionally at least one solvent is useful or effective for separating oil from water in a stream containing a mixture of oil and water or emulsions of oil and water.

In one non-limiting embodiment, the single-phase microemulsion additive useful for oil and water separation is formed by combining two immiscible fluids, at least one demulsifier and at least one water clarifier, with at least one surfactant. Though demulsifiers and water clarifiers are immiscible, it has been discovered that the addition of the surfactant(s) that have the same affinity for the selected demulsifier(s) and water clarifier(s) produces a single-phase microemulsion.

The demulsifiers that are useful in separating oil from water in emulsions or mixtures of oil and water that may be incorporated into the single-phase microemulsion additive include, without limitation, anionic demulsifiers, cationic demulsifiers, non-ionic demulsifiers, crosslinked demulsifiers, acid-based demulsifiers, and/or amphoteric demulsifiers. Specific examples of such demulsifiers include, but are not necessarily limited to, alkylphenol derivatives, ammonium alkylaryl sulfonates, alkylaryl sulfonates, alkylarylsulfonate amine salts, amine polymers, epoxy resins, furandione polymers, oxyalkylated alkanolamines, oxyalkylated alkylphenolic resins, oxyalkylated polyamines, oxyalkylated imine polymers, oxyalkylated polymers, oxyalkylated polyols, oxyalkylated ether sulfate salts, (methyl) oxirane polymers, phenolic polymers, polyether polyols, polyoxyalkylene glycols, polyurethanes, polyoxyalkylenes, polyethers, polyol esters, polyesters, polyglycol diepoxides, polyglycol esters, and combinations thereof. A couple of particularly suitable demulsifiers are oxyalkylated alkylphenolic resin and polyoxyalkylene glycol.

Non-limiting examples of the water clarifiers that may be used to form the single-phase microemulsion additive are polycondensates based on N,N'-bis[3-(dimethylamino)propyl]urea, polyacrylate copolymers, polyacrylamide copolymers, poly(acrylate/acrylamide) copolymers, polycondensates based on alkanolamines, in particular polycondensates based on triethanolamines, dithiocarbamates, and combinations thereof. The water clarifiers may also include, but are not necessarily limited to, anionic starches and/or cationic starches. Suitable starches may include biopolymers, plant starches, potato starches, corn starches, rice starches, tapioca starches, and combinations thereof. In some non-limiting embodiments, the water clarifier may be a cationic starch and/or an anionic starch with a quaternized polyamine. Metal ions, such as zinc, aluminum, iron, and zirconium based metal ions, are also good water clarifiers. These ions may be present in salts including, but not necessarily limited to, zinc chloride, zirconium chloride, aluminum chloride, and the like.

The types of surfactants that may be used to help combine the demulsifier and the water clarifier components into a single-phase microemulsion include, without limitation, non-ionic, anionic, cationic, zwitterionic, amphoteric surfactants, and combinations thereof. Examples of suitable non-ionic surfactants include, but are not necessarily limited to, oxyalkylated alcohols, oxyalkylated amines, aryl oxyalkylates, alkyl oxyalkylates, alkylaryl oxyalkylates, polyglycosides, sorbitan esters, methyl glucoside esters, and polyglycol esters. Examples of suitable cationic surfactants include, but are not necessarily limited to, arginine methyl esters, alkanolamines, and alkylenediamides. Suitable anionic surfactants include, but are not necessarily limited to, alkali metal alkyl sulfates, alkyl or alkyl aryl sulfonates, linear or branched alkyl ether sulfates and sulfonates, alcohol polypropoxylated and/or polyethoxylated sulfates, alkyl or alkylaryl disulfonates, alkyl disulfates, alkyl sulfosuccinates, alkyl ether sulfates, linear and branched ether sulfates, and combinations thereof. Other suitable surfactants include gemini surfactants, extended surfactants such as alkoxy carboxylated and polyglucoside carboxylated, betaines, amino-acids such as cocoyl glutamate, and cationic surfactants such as quaternary ammonium compounds (e.g. polyglycol ether ammonium methyl chloride).

In another embodiment, the single-phase microemulsion additive may further comprise at least one solvent. Non-limiting examples of suitable solvents are (1) glycol ethers, such as ethylene glycol monobutyl ether, dipropylene glycol monomethyl ether, propylene glycol ether, and combinations thereof, and (2) alcohols, such as methanol, isopropyl alcohol, butanol, pentanol, hexanol, iso-octyl alcohol and their isomers, $C_1$-$C_8$ alcohol blends, and combinations thereof.

In one non-restrictive form, the composition of the single-phase microemulsion is as follows: from about 2 wt % independently to about 24 wt %, alternatively from about 6 wt % to about 18 wt %, of the at least one demulsifier; about 1 wt % to about 12 wt %, alternatively from about 3 wt % independently to about 9 wt %, of the at least one water clarifier; from about 2 wt % independently to about 35 wt %, alternatively from about 10 wt % independently to about 25 wt %, of the at least surfactant; and from about 0 wt % independently to about 35 wt %, alternatively from about 10 wt % independently to about 30 wt % of the at least one solvent. The term "independently" as used herein with respect to a range means that any threshold may be used together with any other threshold to form an acceptable alternative range.

The stream to be treated with the single-phase microemulsion additive of the present disclosure may be any stream containing a mixture of oil and water or emulsions of oil and water. In one non-limiting embodiment, the oil may be dispersed within the water phase of the stream or the water may be dispersed within the oil phase of the stream. Alternatively, the water or oil may be emulsified within the other phase such that the stream contains oil-in-water emulsions, water-in-oil emulsions, and/or complex emulsions. The water phase of the stream may be comprised of brine, seawater, and/or fresh water (e.g. groundwater, rivers and streams). Examples of such streams in the oilfield environment in which it would be beneficial to separate the oil from the water include, but are not limited to, fluids produced or recovered from a subterranean reservoir, completion fluids, drilling fluids, injection/fracturing fluids, flowbacks, refinery fluids, and/or chemical processing fluids. In a non-restrictive embodiment, the stream is a fluid produced from a subterranean reservoir comprising combinations or emulsions of crude oil and water.

A goal of the method is to separate the oil from the water in the stream to maximize oil recovery and to clarify the water to an acceptable level for the stream to be discharged to the environment or reused. While complete separation of the oil from the water is desirable, it should be appreciated that complete separation is not necessary for the methods and additives discussed herein to be considered effective. Success is obtained if more water is separated from the oil or vice versa using an effective amount of the single-phase microemulsion additive of the present disclosure than in the absence of an effective amount of it. In an exemplary embodiment, the effective amount of the single-phase microemulsion additive that may be introduced to the stream for purposes of separating oil from water or separating the water from the oil in the stream, as these terms are defined herein, ranges from about 0.01 ppm independently to about 50,000 ppm, from about 1 ppm independently to about 3,000 ppm, or from about 5 ppm independently to about 1,000 ppm, based on the total volume of the stream.

In another non-limiting embodiment, other additives may be added to the stream for treatment including, but not necessarily limited to, coagulants, flocculants, corrosion inhibitors like ethoxylated imidazolines, viscosity reducers, and other chemicals treatments used in crude oil production, refining, and chemical processing. Several additional chemicals, such as friction reducers, scale inhibitors, paraffin inhibitors, pour point depressants, asphaltene inhibitors, clay swelling inhibitors, biocides, antifoulants, flow back aids, additional surfactants, and combinations thereof may be added during treatment with the composition of the present innovation.

The invention will be further described with respect to the following Example, which is not meant to limit the invention, but rather to further illustrate some embodiments.

EXAMPLE

A microemulsion formulated with a demulsifier, water clarifier, surfactants, and co-solvents was introduced to a bottle sample of crude oil (Sample 4) and the performance of this microemulsion additive in separating the oil and water in the crude oil sample was compared to the performance of a bottle sample of crude oil containing no treatment additive whatsoever (Sample 1), a bottle sample of crude oil with only the demulsifier added to it (Sample 2), and a bottle sample of crude oil having a demulsifier and a water clarifier introduced separately (Sample 3). The amount of water separated was measured from each bottle test. The crude oil in each Sample was known to contain 58 vol % water.

The demulsifier used in Sample 2, Sample 3 and Sample 4 is a mixture of oxyalkylated amine, oxyalkylated alcohol and oxyalkylated alkylaryl phenolic resins. The water clarifier used in Sample 3 and Sample 4 is a polycondensate based on triethanolamines. The surfactant used in Sample 4 is blend of a non-ionic oxyalkylates and an anionic alkylaryl sulfonate. The co-solvents in Sample 4 are isopropanol and methanol.

The photographs in the FIG. 1 and the measurements in Table 1 below demonstrate that microemulsion (Sample 4) produced an immediate separation of the oil and water and had significantly better water quality as compared to the samples that only contained the demulsifier separately or the water clarifier separately. It was also observed that sample of crude oil treated with the microemulsion (Sample 4) reached total oil/water separation in less than one minute.

TABLE 1

| | Water Separated (%) | | |
|---|---|---|---|
| Sample | After 0.5 minutes | After 15 minutes | After 30 minutes |
| 1 | 0 | 0 | 0 |
| 2 | 0 | 47 | 58 |
| 3 | 0 | 30 | 58 |
| 4 | 58 | 58 | 58 |

These data indicate that the combination of demulsifier and water clarifier in a microemulsion additive treatment increases the efficiency of the crude oil and produced water separation and that the performance of the single treatment is superior to the performance of the individual, separate treatments of demulsifier and water clarifier.

In the foregoing specification, the invention has been described with reference to specific embodiments thereof, and has been described as effective in providing methods, additives, and treatments for removing separating oil and water. However, it will be evident that various modifications and changes can be made thereto without departing from the broader spirit or scope of the invention as set forth in the appended claims. Accordingly, the specification is to be regarded in an illustrative rather than a restrictive sense. For example, streams, demulsifiers, water clarifiers, surfactants, solvents, emulsions, mixtures, and composition and amounts of additive falling within the claimed parameters, but not specifically identified or tried in a particular Example, are expected to be within the scope of this invention.

The present invention may suitably comprise, consist or consist essentially of the elements disclosed and may be practiced in the absence of an element not disclosed. For instance, the method or treated stream may comprise, consist essentially of, or consist of the steps or components recited in the independent claims. In addition, the single-phase microemulsion additive may comprise, consist essentially of, or consist of at least one demulsifier, at least one water clarifier, at least one surfactant, and at least one solvent, or alternatively, may comprise, consist essentially of, or consist of at least one demulsifier, at least one water clarifier, and at least one surfactant.

The words "comprising" and "comprises" as used throughout the claims, are to be interpreted to mean "including but not limited to" and "includes but not limited to", respectively.

As used herein, the singular forms "a," "an," and "the" are intended to include the plural forms as well, unless the context clearly indicates otherwise.

As used herein, the term "about" in reference to a given parameter is inclusive of the stated value and has the meaning dictated by the context (e.g., it includes the degree of error associated with measurement of the given parameter).

As used herein, the term "and/or" includes any and all combinations of one or more of the associated listed items.

What is claimed is:

1. A method for separating oil and water in a stream comprising a mixture of oil and water, the method comprising:
    introducing an effective amount of a single-phase microemulsion additive to the stream to separate the oil from the water in the stream, and
    separating the oil and water,
    where the single-phase microemulsion additive comprises:
        at least one demulsifier,
        at least one water clarifier selected from a group consisting of:
            a polycondensate derived from N,N'-bis[3-(dimethylamino)propyl]urea,
            a polyacrylate copolymer,
            a polyacrylamide copolymer,
            a poly(acrylate/acrylamide) copolymer, and
            a polycondensate derived from an alkanolamine, and
        an anionic starch selected from the group consisting of:
            a biopolymer, and
            a plant starch, and
            combinations thereof,
        at least one surfactant, and
        optionally at least one solvent,
    where the at least one demulsifier and the at least one water clarifier are immiscible with each other.

2. The method of claim 1, wherein the demulsifier is selected from a group consisting of an anionic demulsifier, a cationic demulsifier, a non-ionic demulsifier, a crosslinked demulsifier, an acid-based demulsifier, an amphoteric demulsifier, and combinations thereof.

3. The method of claim 1, wherein the surfactant is selected from a group consisting of a non-ionic surfactant, an anionic surfactant, a cationic surfactant, a zwitterionic surfactant, an amphoteric surfactant, and combinations thereof.

4. The method of claim 1, wherein the single-phase microemulsion additive comprises a solvent that is selected from a group consisting of one or more glycol ethers, one or more alcohols, and combinations thereof.

5. The method of claim 1, wherein the stream comprises emulsions of oil and water.

6. The method of claim 1, wherein the stream is crude oil.

7. The method of claim 1, wherein the water in the stream is selected from a group consisting of brine, seawater, fresh water, and combinations thereof.

8. The method of claim 1, wherein the effective amount of the single-phase microemulsion additive introduced to the stream ranges from about 0.1 ppm to about 50,000 ppm based on volume of the stream.

9. The method of claim 1, wherein the at least one demulsifier is present in the single-phase microemulsion additive in an amount ranging from about 2 wt % to about 24 wt %, the at least one water clarifier is present in the single-phase microemulsion additive in an amount ranging from about 1 wt % to about 12 wt %, the at least surfactant is present in the single-phase microemulsion additive in an amount ranging from about 2 wt % to about 35 wt %, and the at least one solvent is present in the single-phase microemulsion additive in an amount ranging from about 0 wt % to about 35 wt %.

10. The method of claim 1 where the anionic starch is selected from the group consisting of:
    a biopolymer,
    a corn starch,
    a rice starch,
    a tapioca starch, and
    combinations thereof.

11. A treated stream comprising:
    a stream comprising a mixture of oil and water; and
    a single-phase microemulsion additive comprising:
        at least one demulsifier, at least one water clarifier selected from a group consisting of:
a polycondensate derived from N,N'-bis[3-(dimethylamino)propyl]urea,
a polyacrylate copolymer,
a polyacrylamide copolymer,
a poly(acrylate/acrylamide) copolymer, and
a polycondensate derived from an alkanolamine, and
an anionic starch selected from the group consisting of:
a biopolymer, and
a plant starch,
and combinations thereof,
at least one surfactant, and
at least one solvent,
where the at least one demulsifier and the at least one water clarifier are immiscible with each other, wherein the additive is present in the stream in concentration ranging from about 1 ppm to about 3000 ppm based upon the total volume of the stream.

12. The treated stream of claim 11, wherein the demulsifier is selected from a group consisting of an alkylphenol derivative, an ammonium alkylaryl sulfonate, an alkylaryl sulfonate, an alkylarylsulfonate amine salt, an amine polymer, an epoxy resin, a furandione polymer, an oxyalkylated alkanolamine, an oxyalkylated alkylphenolic resin, an oxyalkylated polyamine, an oxyalkylated imine polymer, an oxyalkylated polymer, an oxyalkylated polyol, an oxyalkylated ether sulfate salt, a (methyl) oxirane polymer, a phenolic polymer, a polyether polyol, a polyoxyalkylene glycol, a polyurethane, a polyoxyalkylene, a polyether, a polyol ester, a polyester, a polyglycol diepoxide, a polyglycol ester, and mixtures thereof.

13. The treated stream of claim 11, wherein the surfactant is selected from the group consisting of an oxyalkylated alcohol, an oxyalkylated amine, an aryl oxyalkylate, an alkyl oxyalkylate, an alkylaryl oxyalkylate, a polyglycoside, a sorbitan ester, a methyl glucoside ester, a polyglycol ester, an arginine methyl ester, an alkanolamine, an alkylenediamide, an alkali metal alkyl sulfate, an alkyl or alkyl aryl sulfonate, a linear or branched alkyl ether sulfate, a linear branched alkyl ether sulfonate, an alcohol polypropoxylated and/or polyethoxylated sulfate, an alkyl or alkylaryl disulfonate, an alkyl disulfates, an alkyl sulfosuccinates, an alkyl ether sulfate, a linear ether sulfate, a branched ether sulfate, a gemini surfactant, a betaine, an amino acid, a quaternary ammonium compound, and combinations thereof.

14. The treated stream of claim 11, wherein the at least one solvent is selected from the group consisting of ethylene glycol monobutyl ether, dipropylene glycol monomethyl ether, propylene glycol ether, methanol, isopropyl alcohol, butanol, pentanol, hexanol, iso-octyl alcohol, a $C_1$-$C_8$ alcohol blend, and combinations thereof.

15. The treated stream of claim 11, wherein the stream is selected from a group consisting of a fluid produced or recovered from a subterranean reservoir, a completion fluid, a drilling fluid, an injection fluid, a fracturing fluid, a flowback, a refinery fluid, a chemical processing fluid, and combinations thereof.

16. The treated stream of claim 11, wherein the stream comprises emulsified water-in-oil.

17. The treated stream of claim 11, wherein the stream comprises emulsified oil-in-water.

18. The treated stream of claim 11 where the anionic starch is selected from the group consisting of:
a biopolymer,
a corn starch,
a rice starch,
a tapioca starch, and
combinations thereof.

* * * * *